United States Patent [19]

Summers

[11] Patent Number: 4,466,449
[45] Date of Patent: Aug. 21, 1984

[54] POWERED ASHTRAY ASSEMBLY

[75] Inventor: Larry E. Summers, Grand Rapids, Mich.

[73] Assignee: GRM Industries, Inc., Grand Rapids, Mich.

[21] Appl. No.: 442,008

[22] Filed: Nov. 16, 1982

[51] Int. Cl.³ .............................................. A24F 19/00
[52] U.S. Cl. .................................... 131/237; 131/231; 296/37.9
[58] Field of Search .................. 131/231, 235 R, 237, 131/240 R; 296/37.9, 37.11, 37.8, 37.1

[56] References Cited

U.S. PATENT DOCUMENTS

| | | | |
|---|---|---|---|
| 2,656,039 | 10/1953 | Leland | 131/231 |
| 3,095,108 | 6/1963 | McKenzie | 296/37.9 |
| 3,337,282 | 8/1967 | Groff et al. | 296/37.9 |
| 3,708,180 | 1/1973 | Bird | 296/37.9 |

Primary Examiner—Vincent Millin
Assistant Examiner—Harry Macey
Attorney, Agent, or Firm—Varnum, Riddering, Schmidt & Howlett

[57] ABSTRACT

A powered ashtray assembly (100) is disclosed for use in automobiles or similar vehicles. The ashtray assembly (100) includes a movable assembly frame (106) slidably mounted within an assembly housing (104). A manually operable switch (140) selectively applies activating signals to a motor (148) secured to frame (106). The motor (148) drives a spline (170) threaded to a stationary shaft (172) secured to a stationary frame (124). Activation of the motor (148) causes the spline (170) to be driven along the shaft (172) so as to selectively extend and retract the assembly frame (106) relative to the assembly housing (104).

15 Claims, 4 Drawing Figures

POWERED ASHTRAY ASSEMBLY

DESCRIPTION

1. Technical Field

The invention relates to vehicle ashtray components and, more particularly, relates to powered ashtray assemblies for use in automobiles or similar vehicles.

2. Background Art

As automobiles and similar operator controlled vehicles become more sophisticated in design, various functional systems of the vehicles are being automated by the manufacturers. For example, the typical modern vehicle often includes several "indicators", each comprising an electrical or electromechanical unit with a dashboard lamp or similar device to warn the operator of a door being ajar, seatbelts unbuckled, etc.

In addition, various mechanisms which conventionally were directly and manually operated by the vehicle operator (or passengers) have been automated by electromechanical means to the extent the operator need only initiate activation or deactivation of such mechanisms. For example, many vehicle manufacturers offer the customer optional equipment conventionally identified as power door locks, power windows, etc.

Automation of such vehicle equipment is not only advantageous because of its sophistication and desirable sales characteristics, but also often provides additional safety features. In addition to the obvious safety features associated with indicators warning of such things as a door being ajar, the automation of equipment such as vehicle windows and the like obviates the necessity of a vehicle operator using one arm for a substantial period of time to open or close a window or to perform other similar functions.

Automation of any vehicle equipment which normally distracts the vehicle operator for a substantial period of time during operation is, of course, advantageous. For example, most vehicles include a cigarette lighter and ashtray assembly within the passenger compartment. Often, these assemblies are retractable into a vehicle dashboard or similar area when not in use. When an assembly is to be used, the vehicle occupant usually must grasp the assembly and exert a force to "open" or extend the assembly from the dashboard. A similar operation must be performed by the vehicle occupant when the assembly is closed. When driving the vehicle, these activities can often be difficult and awkward, in addition to being somewhat dangerous. Automating movement of the ashtray assemblies overcomes these difficulties.

However, automation of any vehicle equipment within the passenger department is not without problems. For example, any type of automation clearly requires a power source. Usually, the most convenient power source is the conventional vehicle battery. However, if the vehicle battery is to be utilized, the automating means must draw small amounts of power.

Another problem with automation relates to the physical size and design of additional components required to automatically control the equipment. Preferrably, these components should not require any substantial modifications of the basic dimensions of the equipment to be automated or other vehicle assemblies, especially if the manufacturer is offering the automated equipment for sale only on an optional basis. That is, the additional components should be as compact as possible, and should be fitted into the basic equipment designs of the vehicle.

On the other hand, though the "automating" components should be compact, reliability must also be achieved. When designing electromechanical control systems, such as those necessary to automate vehicle equipment, complexity of design often increases as the size of the systems are decreased. However, reliability of control systems often decreases in correspondence to increase of design complexity. Furthermore, replacement of failed control system components becomes more difficult as design complexity increases. Finally, the obvious issue of cost is also a concern.

In view of the foregoing, the designer of automated equipment for vehicles must attempt to design cost effective and low power components which are of a size and structure so as to compactly fit into existing vehicle space. However, the designer must also account for ease of control by the vehicle operator, reliability and ease of replacing failed components.

DISCLOSURE OF THE INVENTION

In accordance with the invention, an ashtray assembly for use in the passenger compartment of an operator controlled vehicle and having a stationary housing frame and an assembly frame slidably mounted in the stationary frame includes power means mounted between the frames for exerting forces on the assembly frame with respect to the stationary frame so as to extend and retract the assembly frame. Switch means connected to the power means are selectively activated by the vehicle occupant to generate activating signals and the power means are connected to a battery source and responsive to the activating signals to exert the forces on the assembly frame.

The power means include a motor means mounted to the assembly frame and responsive to the activating signals for generating torque. Means coupled to the motor means and connected to the stationary frame are responsive to the generated torque to exert the forces on the assembly frame.

The assembly further comprises a second switch means mounted between the assembly frame and the stationary frame for detecting approach of the assembly frame to an open or closed position and for generating deactivating signals in response to such approach. The motor means is also connected to the second switch means and is responsive to the deactivating signals for ceasing torque generation.

Further in accordance with the invention, the second switch means comprises a first microswitch which is mounted toward the front of the stationary frame for detecting approach of the assembly frame to the open position. In addition, a second microswitch is mounted toward the rear of the stationary frame for detecting approach of the assembly frame to the closed position.

The motor means includes a bidirectional motor mounted on the assembly frame which is capable of angular rotation in either of two directions. The motor is responsive to deactivating signals for reversing the direction of rotation relative to the previous direction of rotation in response to a subsequent set of activating signals.

The power means includes a threaded shaft rigidly secured to the stationary frame. A spline having an internal thread engages the threaded shaft and the motor means includes means for translating generated torque to rotational forces applied to the spline, thereby causing the spline to rotate and move axially along the shaft. The motor means includes a motor shaft on the bidirectional motor which is perpendicular to the threaded shaft with a worm gear secured to the end of the motor shaft in mesh with the spline. Angular rotation of the motor shaft in a first direction will cause the spline to move axially along the threaded shaft in a manner so that forces are exerted on the assembly frame to extend the assembly frame from the stationary frame. Similarly, angular rotation of the motor shaft in a reverse direction causes the spline to move axially along the threaded shaft in a reverse direction so that forces are exerted on the assembly frame to retract the assembly frame into the stationary frame.

The assembly frame includes an upper plate member and a motor housing is rigidly secured to the underside of the frame member. The motor is mounted within the motor housing and the motor shaft extends therefrom. The threaded shaft is supported through apertures in a pair of vertical brackets which are also connected to the underside of the plate member. A pair of collar and sleeve assemblies are journalled on the shaft within the apertures of the brackets and the spline circumferentially engages the threaded shaft therebetween.

The assembly frame further includes a substantially vertical front plate having the switch means mounted thereto. A pair of vertical side members are connected to the front plate and extend rearward from the plate. The upper plate member is connected to each of the vertical side members and the motor means is mounted to a lower surface of the upper plate member.

BRIEF DESCRIPTION OF THE DRAWINGS

The invention will now be described with reference to the drawings in which.

BEST MODE FOR CARRYING OUT THE INVENTION

Figure 1:
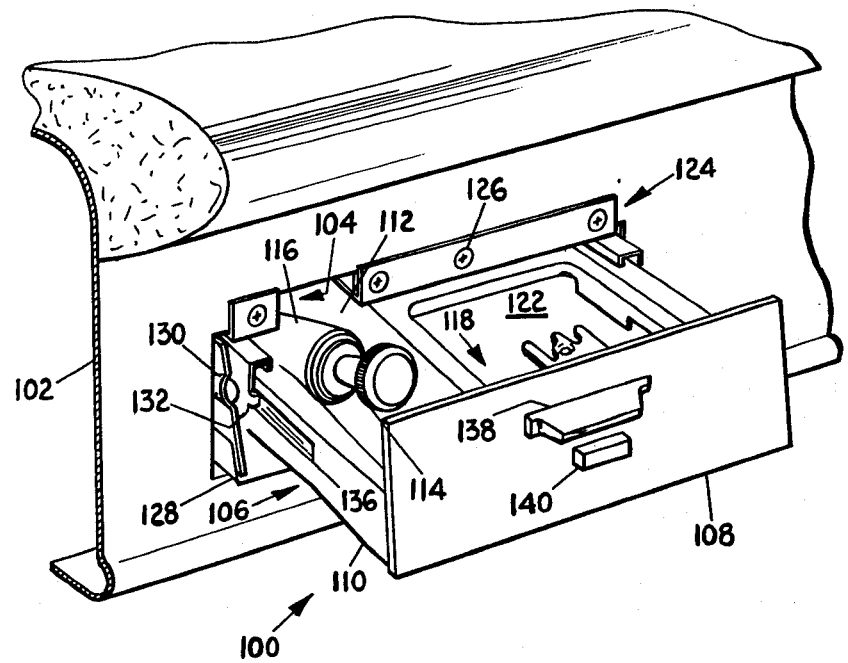
FIG. 1 is a perspective view of one embodiment of an ashtray assembly in accordance with the invention when the assembly is in an extended or "open" position.

The principles of this invention are disclosed, by way of example, in a powered ashtray assembly 100 as shown in the perspective view depicted in FIG. 1. The assembly 100 is adapted for use in an operator controlled vehicle (not shown) having a passenger compartment with a conventional vehicle dashboard 102. The dashboard 102 includes a hollow area having a front opening therein and designated as ashtray assembly housing 104. The ashtray assembly 100 is mounted within housing 104 as subsequently described herein. However, it should be emphasized that assembly 100 or other ashtray assemblies in accordance with the invention need not be mounted specifically in a vehicle dashboard. For example, an ashtray assembly in accordance with the invention could be mounted within a vehicle door or on the rear portion of front compartment seating, thereby being accessible to rear seat passengers.

As further depicted in FIG. 1, the ashtray assembly 100 includes an ashtray assembly frame 106 having a vertical front plate 108, a pair of vertical side members 110 and an upper horizontally disposed plate member 112 interconnected between the side members 110. A conventional cigarette lighter 114 is removably seated within a heating element socket 116 integral with the upper plate member 112. The structure and function of the lighter 114 and heating socket 116 are well-known and do not form any novel concepts of the invention.

Figure 2:
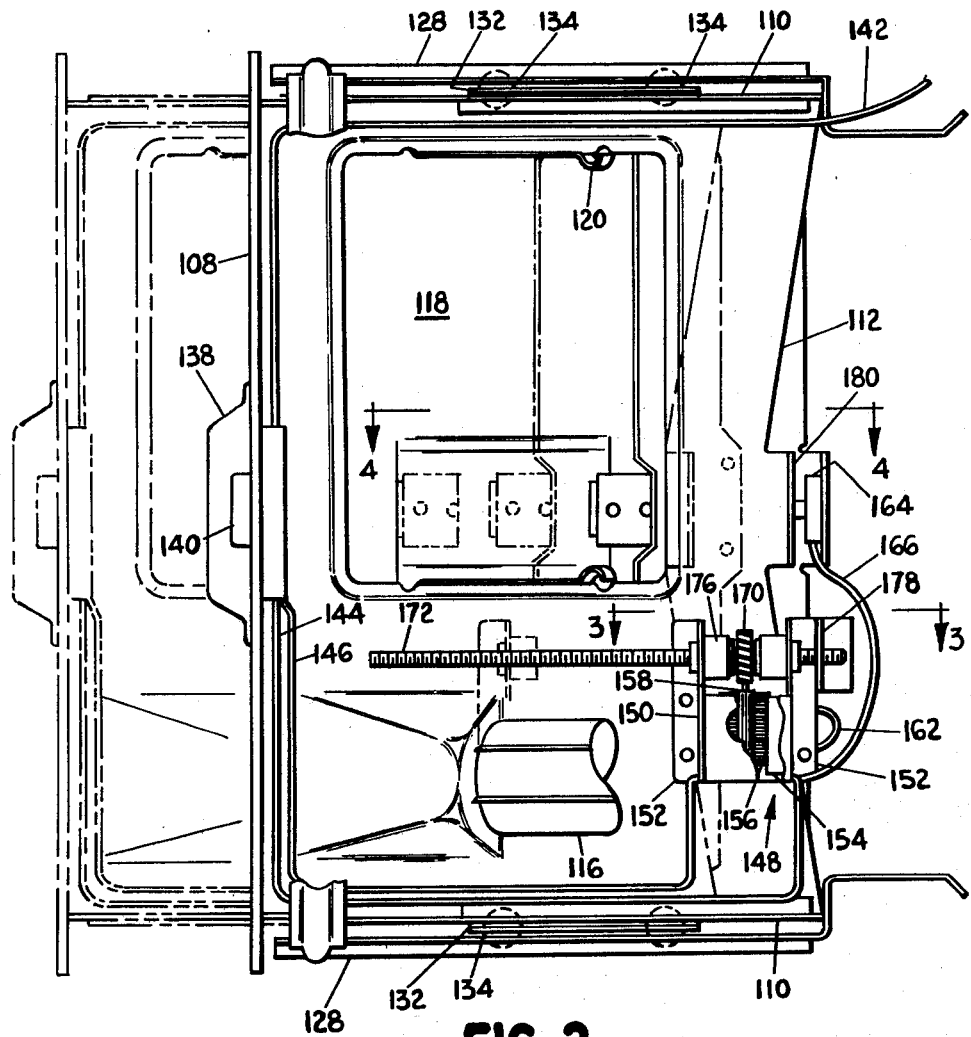
FIG. 2 is a view of the underside portion of the automatic ashtray assembly depicted in FIG. 1, with the components of the assembly shown in their relative positions when the assembly is in a retracted or "closed" position, and with the view further showing in phantom lines the relative position of certain of the components when the assembly is in an extended position.

Adjacent to lighter 114 and heating socket 116 is an ashtray socket 118 "cut out" of the upper member 112. As shown in FIG. 2, the sides of socket 118 include spring clips 120 which serve to secure a conventional and removable ashtray 122 within the ashtray socket 118. To facilitate understanding of the structure of assembly 100, the ashtray 122 is removed from the view of assembly 100 depicted in FIG. 2. The general stucture of assembly frame 106 and the aforedescribed lighter 114 and ashtray 122 mounted thereon is well-known and other types of structural configurations can be utilized without departing from the scope of the invention.

Figure 3:
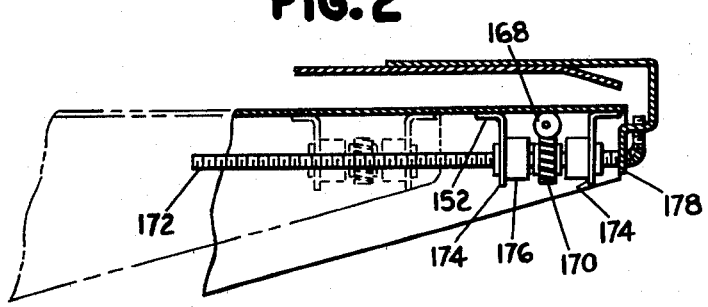
FIG. 3 is a partial sectional view of the control motor components of the assembly taken along lines 3—3 of FIG. 2.

As depicted in FIGS. 1 and 3, a stationary housing frame 124 is mounted to the dashboard 102 by means of screws 126 or similar connecting means. The housing frame 124 includes a pair of vertical side members 128, with each of members 128 having a horizontally disposed channel 130 protruding laterally outward (away from assembly frame 106). Next adjacent to each side member 128 and interior thereto is a vertically disposed bearing brace 132, with each of the braces 132 having a pair of apertures in which a pair of bearings 134 are secured so as to allow free rotation of the same.

Each of the side members 110 of the ashtray assembly frame 106 is next adjacent to a corresponding one of the braces 132 and includes a horizontally disposed channel 136 substantially in the same plane as the channels 130 of side members 128. The bearings 134 are centered relative to this plane and each bearing 134 rotatably seats within one of the channels 130 and one of the channels 136. The bearings 134 secured to the braces 132 thereby provide a means for slidably moving the assembly frame 106 relative to the stationary frame 124.

Again referring to FIGS. 1 and 3, the front plate 108 includes a handle 138 which can be utilized by the vehicle operator or passengers to extend and retract the ashtray assembly 100 when the means for powering the assembly 100 has been disassembled for repair, etc. Positioned below handle 138 and projecting forward of plate 108 is a pushbutton switch mechanism 140. As depicted specifically in FIG. 3, the switch mechanism 140 also extends through and behind plate 108 and is connected to the vehicle's battery source (not shown) by means of cable 142. Electrical components of the switch mechanism 140 are also connected as required to a battery ground. As will be subsequently described herein, switch mechanism 140 is selectively controllable by the vehicle occupant or passengers and provides a means for generating activating signals to extend or retract the ashtray assembly frame 106.

Figure 4:
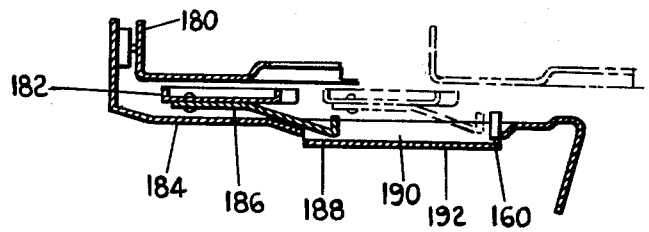
FIG. 4 is a partial side sectional view taken along lines 4—4 of FIG. 2.

The following paragraphs describe elements of assembly 100 depicted in FIGS. 2-4. The push-button switch mechanism 140 is selectively actuable by the vehicle operator or passengers and is a conventional well-known and commercially available electromechanical switch mechanism. Actuation by the vehicle operator causes the switch mechanism 140 to generate activating signals which are applied to cables 144 and 146. Cables 144 and 146 are interconnected between the mechanism 140 and a servocontrol motor 148 mounted in a conventional manner to the underside of upper plate member 112 of assembly frame 106. To facilitate understanding of the structure of assembly 100 as depicted in the underside view of FIG. 2, the cigarette lighter 114 has been removed and the heating element socket 116 is partially cut away.

The motor 148 includes a motor housing 150 having a pair of horizontal flanges 152 rigidly mounted to upper member 112. The housing 150 is depicted partially cut away in FIG. 2. Within the housing 150 and ecured thereto are conventional servomotor components including a pair of stator components 154. The stator components 154 are positioned around armature windings 156 mounted circumferentially about a motor shaft 158. The cables 144 and 146 are conventionally connected to the stator components 154 so that the motor 148 is actuated by application of the activating signals to the stator components 154. This motor activation causes angular rotation of motor shaft 158.

As depicted in FIG. 4, a stationary microswitch 160 is mounted to the forward portion of stationary housing frame 124. A cable 162 extends from microswitch 160 to the motor 148. Similarly, as depicted in FIGS. 2 and 3, a second stationary microswitch 164 is mounted to a rear portion of stationary frame 124 and a cable 166 extends therefrom to motor 148. Actuation of either microswitch 160 or microswitch 164 by means subsequently described herein causes generation of motor deactivation signals on cable 162 or cable 164, respectively. Application of the deactivation signals to the motor 148 causes rotation of motor shaft 158 to be stopped. In addition, the particular deactivation signals applied to motor 148, i.e. either signals from cable 162 or from cable 166, can determine the particular direction of angular rotation of motor shaft 158 when activation signals on cables 144 and 146 are next applied to the motor 148. The connection of cables 144, 146, 162 and 166 to motor 148 so as to achieve the functions described herein in accordance with the invention would be readily apparent to a person skilled in control circuit design having knowledge of the invention. It should be noted that microswitches 160 and 164 can be appropriately grounded so that only one cable need be interconnected between each of the microswitches and the motor 148.

As depicted in FIGS. 2 and 3, the motor shaft 158 is axially connected to worm gear 168. The worm gear 168 is meshed with and drives a spline 170 mounted on a stationary threaded shaft 172. The shaft 172 is supported through apertures in a pair of vertical brackets 174 integral with the flanges 152 connected to upper member 112. A pair of collar and sleeve assemblies 176 are journalled onto shaft 172 and support the shaft 172 within the bracket apertures in a manner so that the shaft 172 can freely slide through the bracket apertures. The shaft 172 is rigidly secured at its rearward end within an aperture of a vertical flange 178 of the stationary housing bracket 124. Accordingly, the shaft 172 remains at all times stationary.

The spline 170 is threadably mounted on shaft 172 and positioned between the collar and sleeve assemblies 176 with exterior teeth meshing with worm gear 168 as previously described herein. The spline 170 is threadably engaged with threaded shaft 172 by means of interior threads not specifically depicted in the drawing.

As depicted in FIGS. 2 and 4, the rear portion of upper member 112 of assembly frame 106 is integral with a centered vertical flange 180 which abuts the microswitch 164 when the assembly 100 is in a "closed" position, i.e. the assembly frame 106 is fully retracted into the assembly housing 104. Positioned below the upper member 112 as shown in FIG. 4 is a lower member 182 which is connected to the upper member 112 and moves in correspondence therewith. Positioned below the lower member 182 and rigidly secured thereto by means such as rivots 184 is a "stop" bracket 186 having an angled flange 188 which moves in correspondence with assembly frame 106 but remains located within a recessed portion 190 of a substantially horizontal member 192 of stationary housing frame 124. When the assembly 100 is in a completely "open" position, i.e. the assembly frame 106 is fully extended from the assembly housing 104, one end of flange 188 abuts microswitch 160.

The operation of ashtray assembly 100 in accordance with the invention will now be described with reference to FIGS. 1–4. With the ashtray assembly 100 in a fully "closed" position as depicted in FIG. 2, the assembly frame 106 is completely retracted within the assembly housing 104. When the vehicle operator or passengers activate the assembly 100 by momentarily pressing switch mechanism 140, the mechanism 140 generates output activating signals on cables 144 and 146 which are applied as input signals to motor 148. Motor 148 is responsive to the activating signals to cause rotation of shaft 158 which, in turn, rotates worm gear 168 and drives the spline 170. Accordingly, the motor 148 and associated components provides a means responsive to activating signals from switch mechanism 140 to generate torque and exert a rotational force on spline 170.

With the spline 170 internally threaded and engaged with corresponding threads on stationary shaft 172, the rotational forces applied to spline 170 through worm gear 168 will cause the spline 170 to be axially driven along the shaft 172. The angular rotation of the motor shaft 158 will be of a direction so that the spline 170 is axially driven towards the front of assembly 100, i.e. toward the left side of FIG. 2.

With the shaft 172 rigidly secured in a stationary manner within flange 178, and further secured from any lateral movement by means of the supporting brackets 174, the forces associated with the rotation of spline 170 and its axial movement along shaft 172 will be translated back through the rigid connection of motor 148 to assembly frame 106. The forces thus exerted on frame 106 will be in a direction toward the front of assembly housing 104 and will cause the assembly frame 106 to move forward relative to housing shell 124 through rotation of the bearings 134. It should be noted that each of the bearing braces 132 will move at approximately twice the velocity of the assembly frame 106.

The assembly frame 106 will continue to move and the ashtray assembly 100 will be extended from the assembly housing 104 until the flange 188 of stop bracket 186 contacts the microswitch 160. At that time, a deactivating signal will be generated by microswitch 160 and applied to the motor 148 through cable 162. This deactivating signal will cause the motor shaft 158 to cease rotation and, correspondingly, the assembly frame 106 will also cease movement. In this position, the ashtray assembly 100 is considered fully extracted from the assembly housing 104. In addition to causing the motor 148 to stop, the deactivating signal applied from cable 162 will also cause the motor shaft 158 to rotate in a direction of angular rotation opposite to its previous jotation upon the next subsequent application of activating signals on cables 144 and 146.

In accordance with the foregoing, if the vehicle operator or passenger presses switch mechanism 140 with the assembly 100 in the fully extended position, the corresponding activating signals applied on cables 144 and 146 to motor 148 will cause the motor shaft 158 to rotate in a direction whereby the spline 170 is axially driven toward the rear portion of shaft 172, i.e. toward the right side of the view depicted in FIG. 2. Correspondingly, and in reverse directional action to that previously described, forces will be exerted on assembly frame 106 so that the frame 106 retracts into the assembly housing 104 by means of movement relative to the stationary housing frame 124 through the bearings 134. The assembly frame 106 will continue to retract into the housing 104 until the previously described vertical flange 180 contacts microswitch 164. Upon contact, the microswitch 164 will generate a deactivating signal on cable 166 which is applied to the motor 148. This deactivating signal will cause the motor shaft 158 to cease movement and, in addition, will cause the motor shaft 158 to again reverse angular rotation upon the next subsequent application of activating signals on cables 144 and 146.

It should be emphasized that other powered ashtray assemblies in accordance with the invention can utilize various structures of brackets, members, etc. which differ from those described with respect to assembly 100 herein. Furthermore, means other than the bearings 134 and associated mechanical structures can be utilized to provide movement of the ashtray assembly proper relative to an assembly housing without departing from the novel concepts of the invention. In addition, other electromechanical structures which differ from those of switch mechanism 140 and microswitches 160 and 164 can be utilized in accordance with the invention. For example, to maintain activation of the motor 148, the vehicle operator may be required to continuously exert a force on switch mechanism 140. That is, the motor 148 can be caused to cease rotation if the switch mechanism 140 is not continuously activated. Similarly, the switch mechanism 140 and the motor 148 can be electrically interconnected so that the motor 148 automatically reverses angular rotation from its previous rotation without requiring an electrical interface with microswitches. That is, the motor 148 can be caused to independently alternate angular rotation upon successive activations of the switch mechanism 140.

In addition, other principles of the invention are not limited to the specific ashtray assembly described herein. It will be apparent to those skilled in the art that modifications and variations of the abovedescribed illustrative embodiment of the invention, other than those specifically described herein, are possible without departing from the spirit and scope of the invention.

The embodiments of the invention in which an exclusive property or privilege is claimed are defined as follows:

1. In an ashtray assembly for use in an operator controlled vehicle having a battery source, wherein the assembly includes a stationary frame mounted within an assembly housing and an assembly frame slidably mounted to the stationary frame so as to be selectively retractable into a closed position within the housing and selectively extendable into an open position forward of the housing, the improvement which comprises:
   power means adapted to be connected to the battery source and mounted between the assembly frame and the stationary frame for exerting forces on the assembly frame with respect to the stationary frame so as to selectively extend and retract the assembly frame;
   switch means electrically coupled to the power means and responsive to selective activation by a vehicle occupant for generating activating signals; and
   the power means is responsive to the activating signals to exert the forces on the assembly frame.

2. An ashtray assembly in accordance with claim 1 characterized in that the power means comprises:
   motor means mounted to the assembly frame and electrically coupled to the switch means for generating torque in response to the activating signals; and
   means coupled to the motor means and secured to the stationary frame and responsive to the generated torque for exerting the forces on the assembly frame with respect to the stationary frame.

3. An ashtray assembly in accordance with claim 2 characterized in that the means coupled to the motor means comprises a threaded shaft rigidly secured to the stationary frame and a spline having an internal thread engaging the threaded shaft; and
   the motor means comprises means for translating generated torque to rotational forces applied to the spline, thereby causing the spline to rotate and move axially relative to the threaded shaft.

4. An ashtray assembly in accordance with claim 3 characterized in that the motor means further comprises a bidirectional motor having a motor shaft perpendicular to the threaded shaft and the means for translating the generated torque comprises a worm gear secured to the motor shaft in mesh with the spline.

5. An ashtray assembly in accordance with claim 4 characterized in that the threaded shaft is positioned axially along the direction of movement of the assembly frame;
   angular rotation of the motor shaft in a first direction causes the spline to move axially along the threaded shaft in a manner so that forces are exerted on the assembly frame to extend the assembly frame from the stationary frame; and
   angular rotation of the motor shaft in a reverse direction causes the spline to move axially along the threaded shaft in a manner so that forces are exerted on the assembly frame to retract the assembly frame into the assembly housing.

6. An ashtray assembly in accordance with claim 4 characterized in that:
   the assembly frame comprises an upper horizontal plate member;
   the motor means further comprises a motor housing rigidly secured to an underside of the upper member;
   the motor is mounted within the motor housing and the motor shaft extends therefrom;
   the threaded shaft extends through apertures in a pair of vertical brackets connected to the underside of the upper member; and
   a pair of collar and sleeve assemblies are journalled on the threaded shaft and extend through the apertures of the vertical brackets, and the spline is positioned between the vertical brackets.

7. An ashtray assembly in accordance with claim 2 characterized in that the assembly frame comprises:
a front plate having the switch means mounted thereon;
a pair of vertical side members connected to the front plate and extending rearward therefrom; and
an upper plate member connected to each of the vertical side members and having the motor means mounted to a lower surface thereof.

8. An ashtray assembly in accordance with claim 7 characterized in that the assembly further comprises second switch means positioned between the assembly frame and the stationary frame for detecting approach of the assembly frame to the open or closed position and for generating deactivating signals in response thereto; and
the motor means is connected to the second switch means and responsive to the deactivating signals for ceasing generation of torque.

9. An ashtray assembly in accordance with claim 8 characterized in that the second switch means comprises a first microswitch mounted on the stationary frame toward the front of the upper plate member for detecting approach of the assembly frame to the open position, and a second microswitch is mounted on the stationary frame toward the rear of the upper plate member for detecting approach of the assembly frame to the closed position.

10. An ashtray assembly in accordance with claim 9 and further comprising means for reversing the direction of angular rotation of the motor means relative to the previous direction of rotation in response to a subsequent generation of activating signals.

11. An ashtray assembly in accordance with claim 1 characterized in that the power means comprises motor means capable of angular rotation in either of two directions and responsive to a generation of the activating signals to reverse the direction of angular rotation relative to the direction of rotation responsive to an immediately prior generation of activating signals.

12. An ashtray assembly in accordance with claim 1 characterized in that the switch means comprises first and second switches selectively activated by the vehicle occupant for generating first and second sets of activating signals, respectively; and
the power means comprises motor means responsive to the first set of activating signals for generating torque in a first direction and further responsive to the second set of activating signals for generating torque in a reverse direction.

13. An ashtray assembly in accordance with claim 1 characterized in that the assembly further comprises:
second switch means interposed between the assembly frame and the stationary frame for detecting approach of the assembly frame to the open or closed position and for generating deactivating signals in response thereto; and
the power means is further connected to the second switch means and responsive to the deactivating signals for ceasing exertion of the forces on the assembly frame.

14. An ashtray assembly in accordance with claim 13 characterized in that the second switch means comprises a first microswitch mounted towards the front of the stationary frame for detecting approach of the assembly frame to the open position, and a second microswitch mounted towards the rear of the stationary frame for detecting approach of the assembly frame to the closed position.

15. An ashtray assembly in accordance with claim 13 characterized in that the power means comprises motor means mounted on the assembly frame and capable of angular rotation in either of two directions, the motor means being responsive to the deactivating signals for reversing the direction of angular rotation relative to the immediately previous direction of rotation in response to a subsequent generation of activating signals.

* * * * *